E. A. SPERRY AND T. H. PHILLIPS, Jr.
DIRIGIBLE GRAVITY BOMB.
APPLICATION FILED JULY 26, 1918.

1,384,868.

Patented July 19, 1921.

INVENTORS
ELMER A. SPERRY.
THOMAS H. PHILLIPS, JR.
BY Herbert H. Thompson
their ATTORNEY

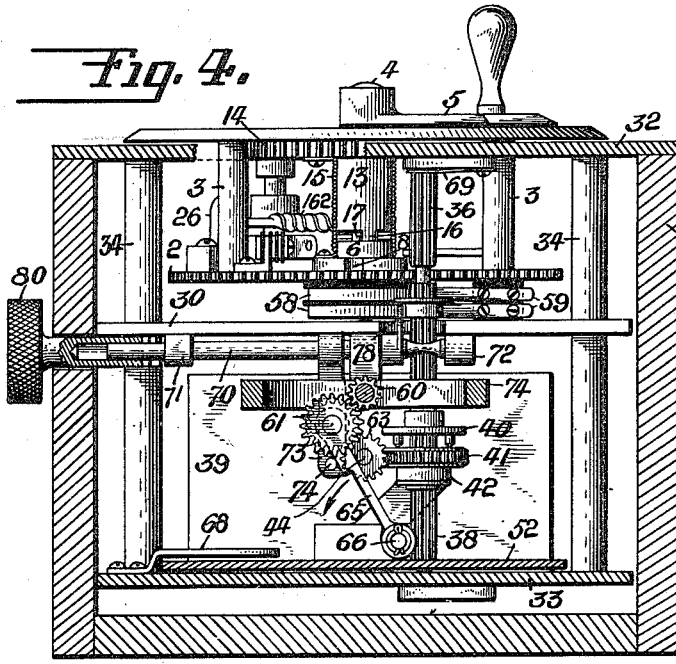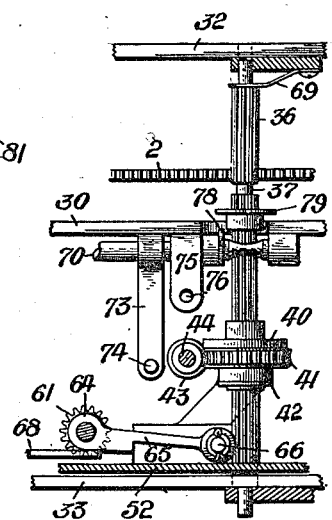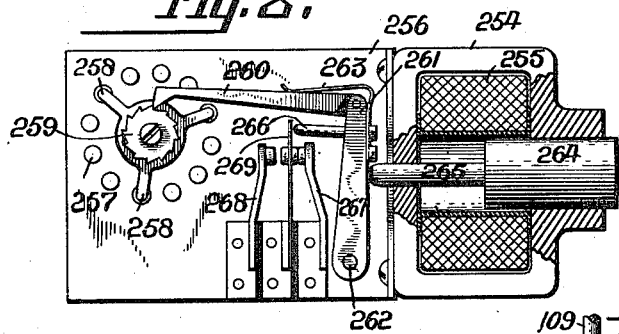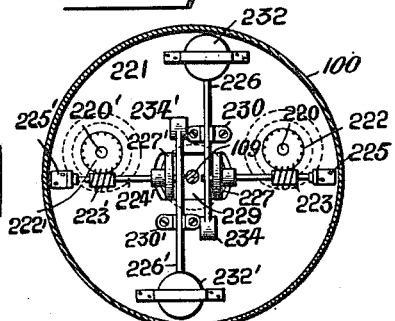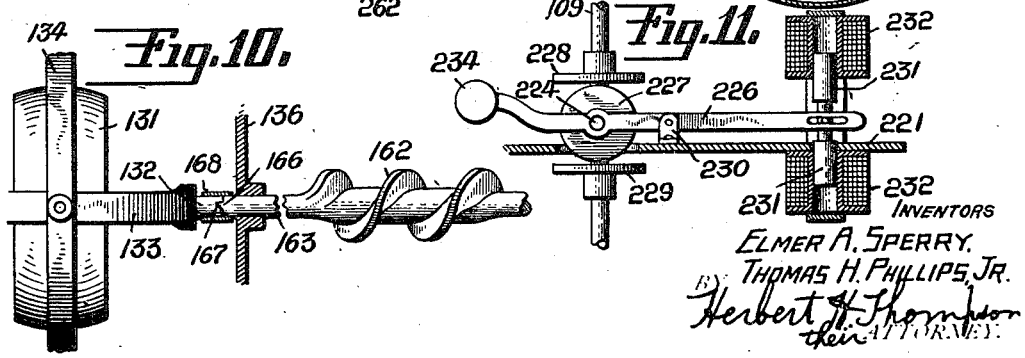

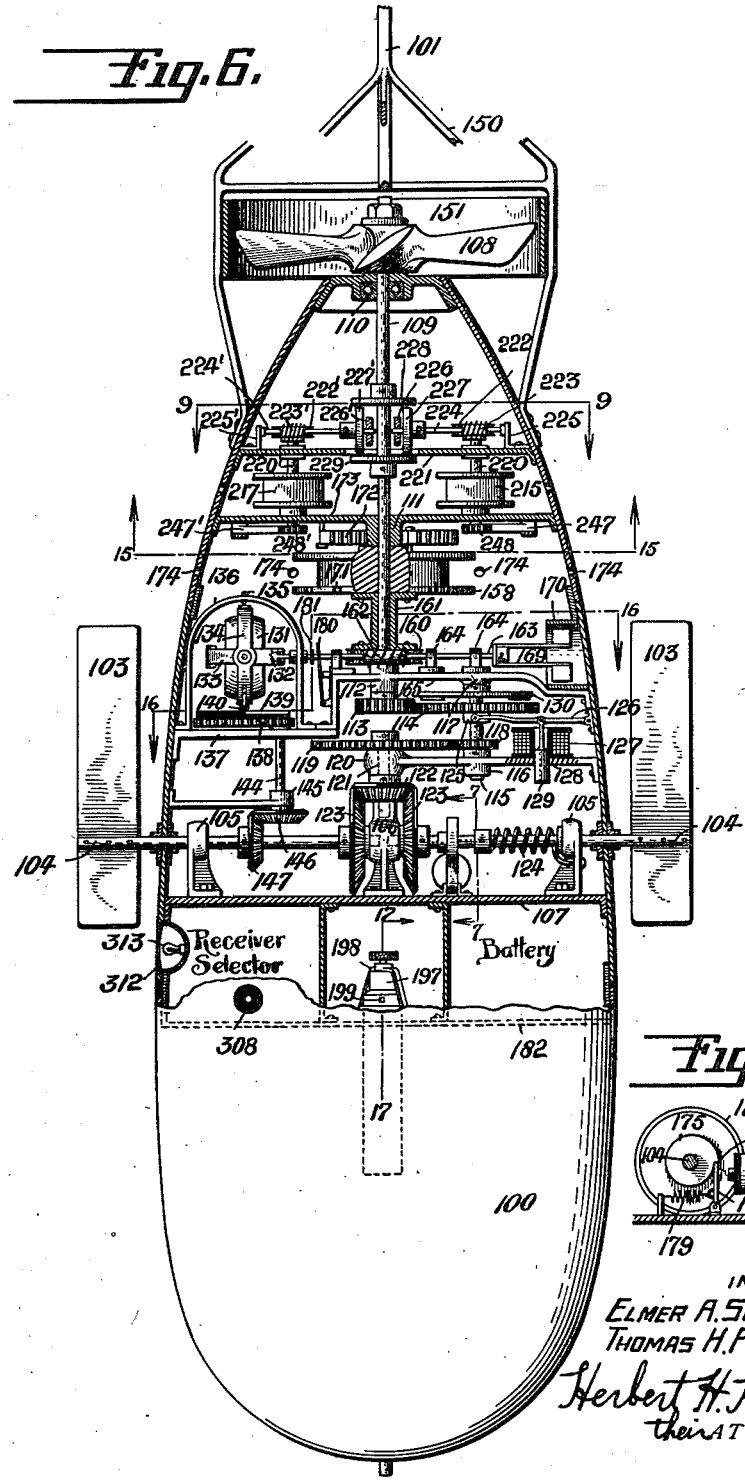

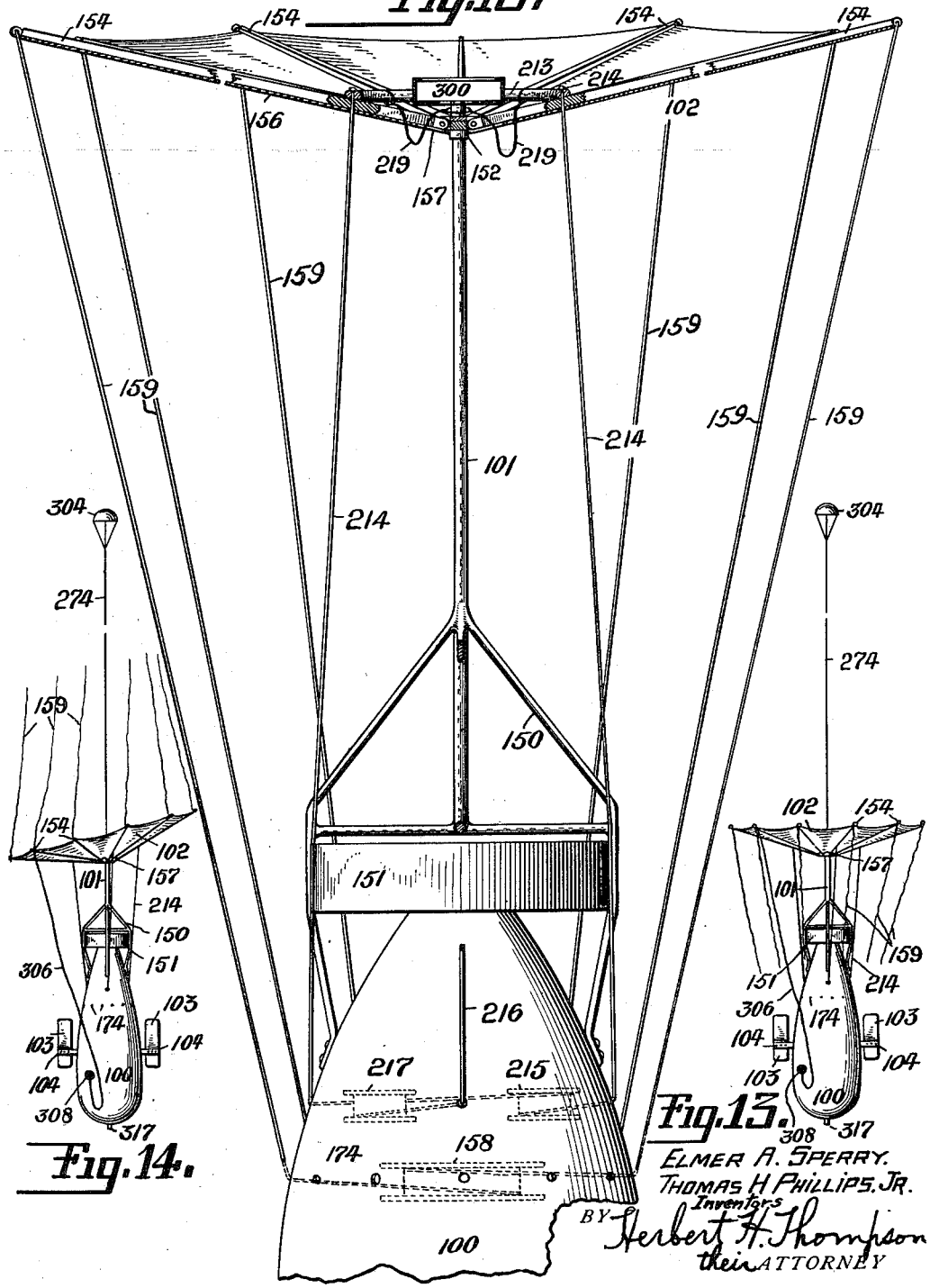

E. A. SPERRY AND T. H. PHILLIPS, Jr.
DIRIGIBLE GRAVITY BOMB.
APPLICATION FILED JULY 26, 1918.
1,384,868.
Patented July 19, 1921.
7 SHEETS—SHEET 5.
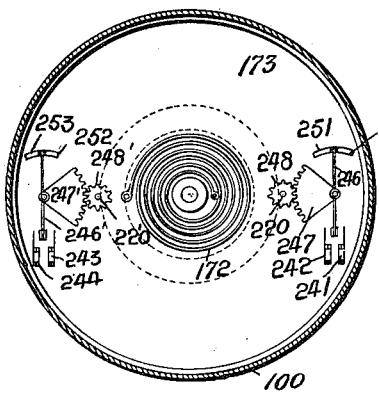
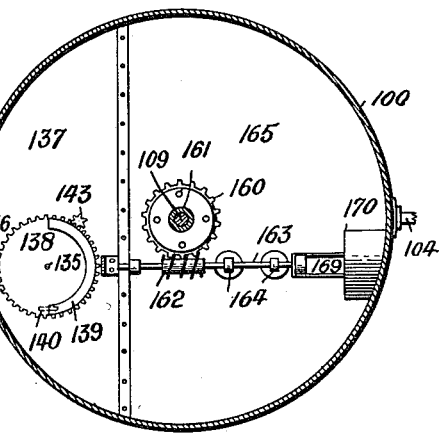
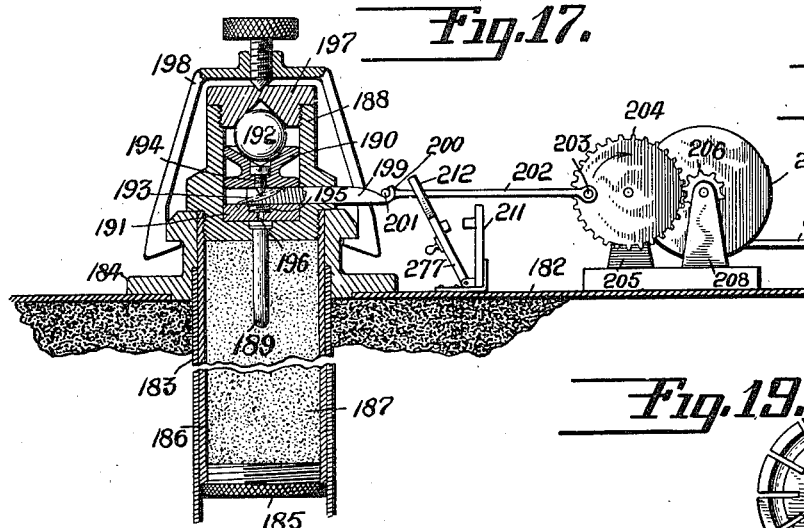
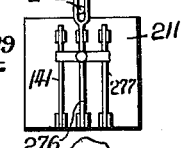
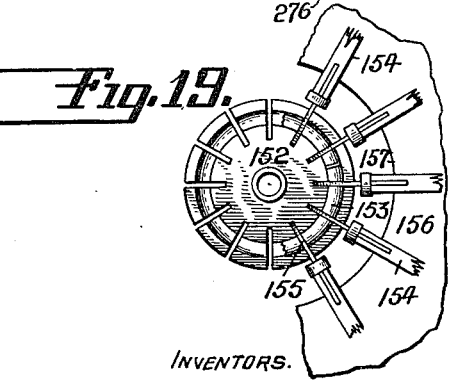
INVENTORS.
ELMER A. SPERRY.
THOMAS H. PHILLIPS, JR.
BY Herbert H. Thompson
Their ATTORNEY E. A. SPERRY AND T. H. PHILLIPS, Jr.
DIRIGIBLE GRAVITY BOMB.
APPLICATION FILED JULY 26, 1918.
1,384,868.
Patented July 19, 1921.
7 SHEETS—SHEET 6.
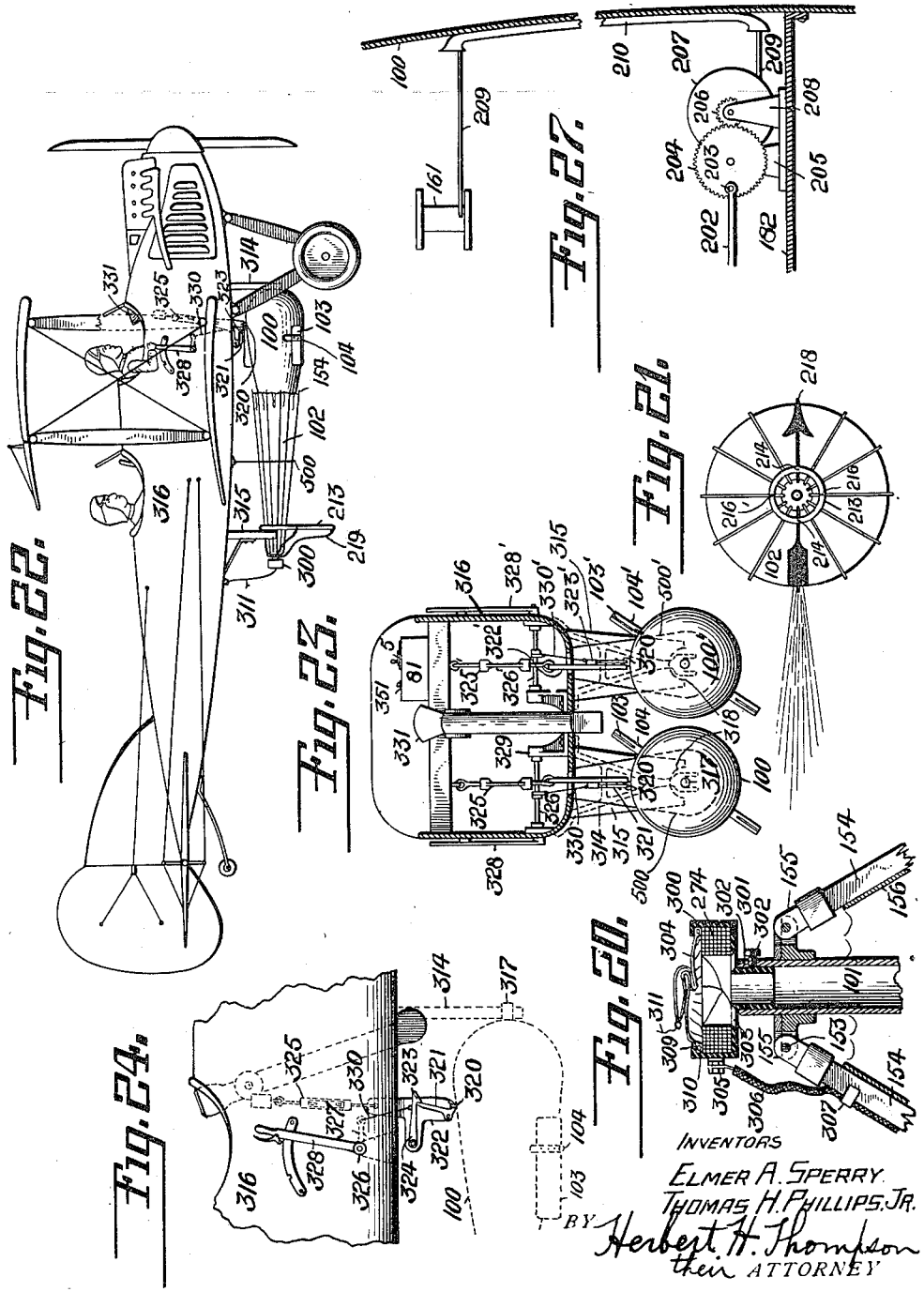
INVENTORS
ELMER A. SPERRY
THOMAS H. PHILLIPS, JR.
BY Herbert H. Thompson
their ATTORNEY

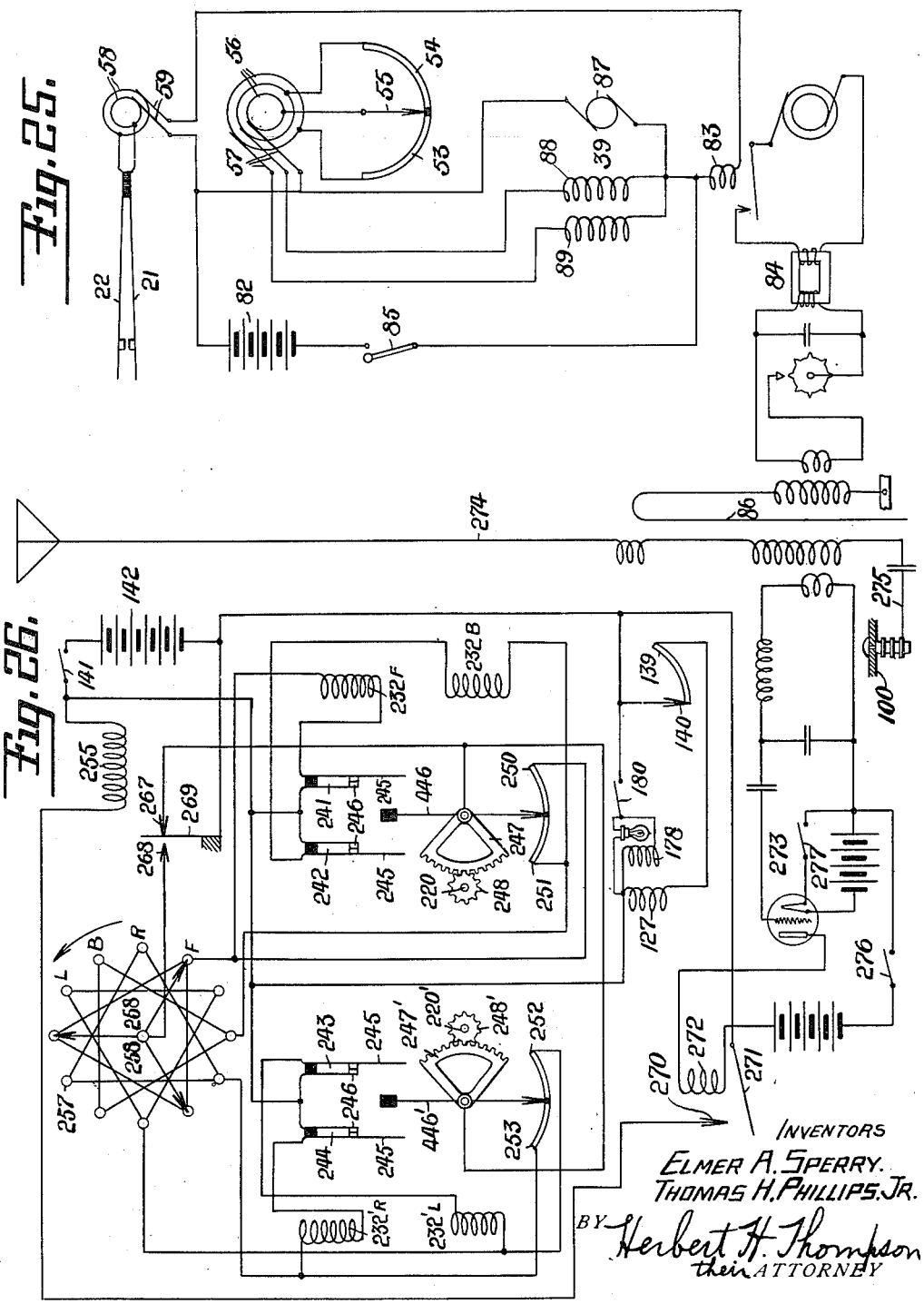

UNITED STATES PATENT OFFICE.

ELMER A. SPERRY AND THOMAS H. PHILLIPS, JR., OF BROOKLYN, NEW YORK; SAID PHILLIPS, JR., ASSIGNOR TO SAID SPERRY.

DIRIGIBLE GRAVITY-BOMB.

1,384,868. Specification of Letters Patent. Patented July 19, 1921.

Application filed July 26, 1918. Serial No. 246,856.

*To all whom it may concern:*

Be it known that we, ELMER A. SPERRY and THOMAS H. PHILLIPS, Jr., citizens of the United States, residing at 1505 Albemarle road and 31 Essex street, respectively, Brooklyn, in the county of Kings and State of New York, have invented certain new and useful Improvements in Dirigible Gravity-Bombs, of which the following is a specification.

This invention relates to bombs adapted to be dropped from aircraft and means for changing the path of descent thereof after they have been released from the aircraft.

In spite of the numerous bomb sights which have been perfected, the percentage of hits scored by bombs dropped from aircraft, especially aeroplanes, is low. This lack of accuracy is not surprising in view of the many variables which must be taken into account in theoretically correct sighting. Thus it is necessary that the ground speed and altitude of the aircraft be taken into account, both of which factors are difficult to determine accurately, as is also the additional factor of wind velocity. The accuracy of fire may be enhanced somewhat by flying low when the bomb is dropped but this method exposes the bombing plane to great danger of being struck by enemy projectiles.

In view of the above, the utility and advantages of a system in which the path of descent of a bomb may be changed while the latter is descending are apparent. The principal object of the present invention is to provide such a system. Numerous other objects and advantages will be apparent as the invention is hereinafter developed and will be pointed out specifically in the claims.

Referring to the drawings which illustrate what we now consider the preferred form of our invention:

Fig. 4 is a section on the line 4—4 of Fig. 1.

Fig. 5 is a fragmentary detail elevation of certain of the parts of the mechanism illustrated in Figs. 1, 2 and 4.

Fig. 6 is a fragmentary sectional elevation illustrating one form of bomb.

Fig. 7 is a detail section taken on the line 7—7 of Fig. 6.

Fig. 8 is an elevation partly in section of a preferred form of selector employed in our bomb.

Fig. 9 is a section on the line 9—9 of Fig. 6.

Figs. 10 and 11 are fragmentary enlarged detail elevations of parts of the structure illustrated in Fig. 6.

Fig. 12 is a fragmentary elevation, partly in section of the upper part of the bomb.

Fig. 13 is a view on a smaller scale of the bomb after launching and showing the drag rudder in open position.

Fig. 14 is a view similar to Fig. 13 but showing the drag rudder tilted to change the path of descent of the bomb.

Fig. 15 is a section on the line 15—15 of Fig. 6.

Fig. 16 is a section on the line 16—16 of Fig. 6.

Fig. 17 is a sectional detail taken on the line 17—17 of Fig. 6.

Fig. 18 is a detail elevation of the switch shown in Fig. 17.

Fig. 19 is a fragmentary detail plan view illustrating one form of means which may be employed to secure the ribs of the drag anchor to the bomb.

Fig. 20 is a detail elevation of the structure illustrated in Fig. 19, together with the receiving antennæ and its housing.

Fig. 21 is a plan view of the bomb as it appears when descending.

Figs. 22 and 23 are respectively an elevation and transverse section of an aeroplane showing a plurality of bombs attached thereto.

Fig. 24 is a fragmentary elevation on a larger scale of a part of the structure illustrated in Fig. 22.

Fig. 25 is a wiring diagram of the apparatus at the sending station.

Fig. 26 is a wiring diagram of the apparatus on the bomb.

Fig. 27 is a fragmentary sectional detail elevation taken on a plane through the axis of the bomb but at right angles to the plane on which Fig. 6 is taken.

Figure 2:
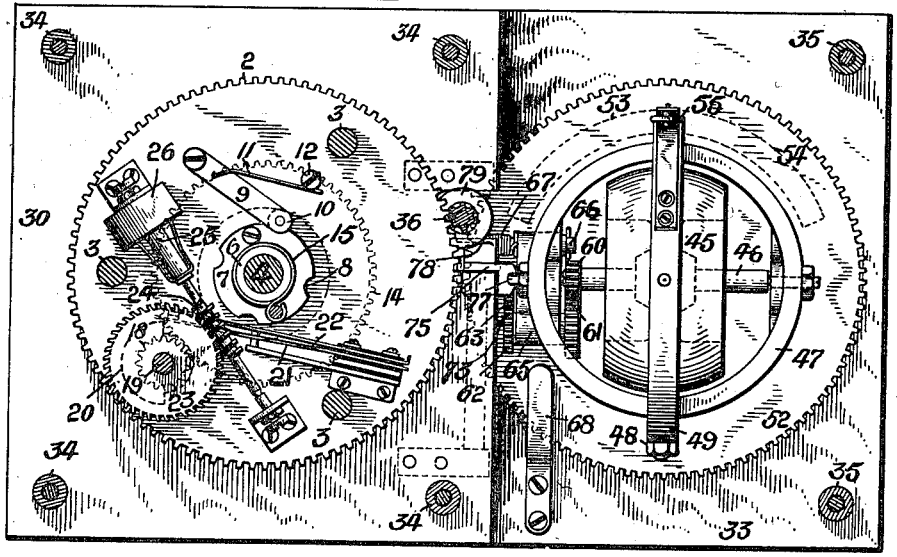
Fig. 2 is a section on the line 2—2 of Fig. 1.
Figure 1:
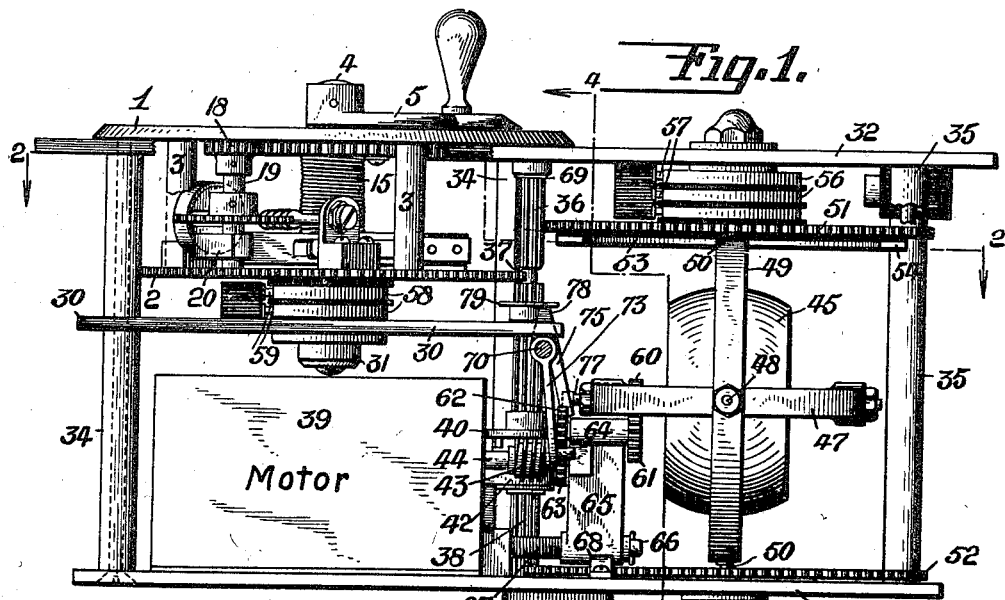
Figure 1 is an elevation of one form of sending instrument and stabilizing means therefor, with the inclosing case or box removed.

Before proceeding with the detailed description of the specific physical embodiment herein disclosed, we wish to outline our invention in a somewhat general way. The bomb is provided with a parachute element which we term a drag rudder in view of the fact that this element serves both to retard the descent of the bomb and to steer the latter. In order to control the path of descent by the drag rudder the bomb is provided with means to stabilize it in azimuth. By tilting the drag rudder in any of a plurality of directions the bomb may be caused to drift or move horizontally in a corresponding direction. Selective means is provided on the bomb for controlling the tilting of the drag rudder, this selective system being controlled by impulses of radiant energy sent from the controlling station. For sending said impulses we employ a suitable form of radio sender and a sending instrument for controlling the same. The system is preferably so designed that all that is necessary to cause the bomb to move in a desired direction is to point the control element or handle of the sending instrument in that direction. In order to render this action possible we stabilize the sending instrument in azimuth.

Referring to Figs. 1 to 4, it will be seen that the major portion of the sending instrument is located between a plurality of circular plates 1, 2 secured to each other in spaced apart relation by a plurality of posts 3. A shaft 4 is journaled for rotation in said plates and is provided at one end with the indicating manually operable control element 5 secured thereto. Said shaft is provided adjacent the plate 2 with an enlarged hub 6 and a flange 7. The latter may be provided with a plurality of notches 8, shown spaced 90° apart, adapted to coöperate with a spring pressed arm 9 to releasably hold the shaft 4 and arm 5 in any one of four positions with respect to plates 1 and 2. The arm 9 is shown pivoted at one end on plate 2, provided at its opposite end with a roller 10 adapted to seat in said notches and biased to locking position by a spring 11 secured to said arm and engaging a pin 12 on the plate 2. While the circuit controller of the sending instrument may be directly operated by said shaft 4 we prefer to provide connections whereby the time of contact will be practically constant, although the control element may be operated at high and different angular velocities. One form of such connections is illustrated in Figs. 1 to 4 and may be constructed substantially as follows:

A sleeve 13 is rotatably mounted on the shaft 4 between the hub 6 and plate 1 and has secured thereto a gear 14. A spring 15 surrounds said sleeve and shaft and is secured at one end to the flange 7 and at the other end to said gear 14 so that the latter will follow clockwise rotation of the element 5. Said spring 15 tends to maintain the lug 16 on sleeve 13 in engagement with a pin 17 carried by the hub 6. The gear 14 meshes with a pinion 18 secured to a shaft 19 rotatably mounted in the plates 1 and 2. A cam 20 of insulating material is also secured to said shaft 19 in a position to engage a contact arm 21 to cause the latter to engage a similar contact arm 22. These contact arms are insulated from each other and from the plate 2 on which they are supported. The design of the above mentioned parts is preferably such that when the element 5 is in any one of the four positions determined by the arm 9, cam 20 causes engagement of arms 21, 22. When the element 5 is rotated slightly from one of said four positions the cut-away portion of said cam permits opening of the contacts due to the inherent resiliency of arm 21. The gear ratio 14—18 is preferably 4 to 1, so that contact between arms 21, 22 will be established ahead of each of the said four positions of element 5 and broken slightly thereafter.

Figure 3:
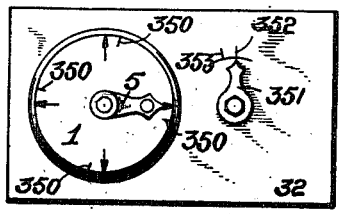
Fig. 3 is a plan view, on a smaller scale, of the mechanism shown in Fig. 1.

In order to prevent excessively high rotation of the cam 20, the shaft 19 of the latter has secured thereto a wormwheel 23 which drives a speed limiting device. The latter is shown as comprising a centrifugal governor 25 geared to said wheel 23 by means of a worm 24 on said governor shaft. The governor weights are designed so as to engage the interior of a friction drum 26 when said governor attains a predetermined speed. It will be obvious that when the element 5 is rotated in a clockwise direction the cam 20 will be rotated at or below the predetermined speed until lug 16 catches up to and engages the lug 17. Counter-clockwise rotation of element 5 will be prevented by the arm 9 and openings 8. Arrows or other indicating symbols may be provided on the plate 1 as shown in Fig. 3 to indicate the four main positions of the control element 5.

The sending instrument above described is designed primarily to be employed on an aeroplane to control a bomb dropped therefrom and as above stated we prefer to provide a system wherein the bomb will travel in whichever direction the hand 5 is pointed. Means are therefore provided for maintaining the sending instrument fixed in azimuth regardless of the movement of the aeroplane or support on which the said instrument is mounted. One form of such means is illustrated in Figs. 1 to 5 and may be constructed substantially as follows:

The shaft 4 is rotatably but non-slidably mounted in a bearing 31 in the plate 30 secured between plates 32 and 33 by means of posts 34. The plates 32, 33 are also secured together by means of posts 35. The plate 2 is made in the form of a spur gear adapted to mesh with a pinion 36 on a shaft 37, said gears 2 and 36 being normally disengaged as shown in Figs. 1 to 4. The shaft 37 is adapted to be driven by a motor 39 through the following gearing. The shaft 37 has secured thereto one element 40 of a clutch of which the other element is shown in the form of a wormwheel 41. The latter is rotatably mounted in a bearing 42 secured to plate 33 and meshes with a worm 43 on the shaft 44 of the motor 39.

A gyroscopic rotor 45 is secured to a shaft 46 journaled for rotation in a ring 47, in turn rotatably mounted in a ring 49 about a horizontal axis 48, at right angles to the shaft 46. The ring 49 is mounted for rotation, about its vertical axis, on pivots 50 secured at the centers of the gears 51, 52. The latter have the same number of teeth as the gear 2, are rotatably mounted on the plates 32, 33 respectively and mesh with the pinions 36, 38 on shaft 37. One of the gears 51 may be provided with a pair of contact segments 53, 54 insulated from each other and from said gear and adapted to be engaged alternately by a contact roller 55 carried by the ring 49. Current may be conducted to the contacts 53, 54, 55 and to arms 21, 22 by means of slip rings 56 and 58, and brushes 57, 59 respectively.

The motor 39 may be employed also to spin up the rotor 45. For this purpose the shaft 46 of said rotor is provided with a gear 60 and the motor shaft 44 with a gear 63, said gears being adapted to be connected by a releasable gear train 61, 62. The gears 61, 62 are secured to a common shaft journaled in a bearing 64 carried by an arm 65. The latter is shown rotatably mounted on a rod 66, secured to plate 33, and biased for rotation in the direction of the arrow in Fig. 4 by means of a spring 67. A plate 68 may be secured to the base 33 in a position to be engaged by the arm 65 when the latter is in the inoperative position to prevent interference with the rotation of the gear 52.

The shaft 37 is engaged at one end by a spring 69 which tends to shift said shaft downwardly. In order to hold the shaft 37 in its upper position, the arm 65 in operative position and the ring 47 against movement while the gyro is being spun up by the motor 39, the following structure may be employed.

A rock shaft 70 is rotatably journaled at 71, 72 on the plate 30. Said shaft is provided with an arm 73 carrying a pin 74 adapted to engage the arm 65 to hold the gears 61, 62 in mesh with gears 60, 63 respectively. The shaft 70 is also provided with an arm 75 having a hole 76 adapted to receive a pin 77 secured to the ring 47 to lock the latter against movement. A third operating element shown in the form of a cam 78 is secured to said shaft 70 in a position to engage a flange 79 secured to the shaft 37 for the purpose of raising and holding said shaft 37 in its upper position (see Fig. 1) against the action of the spring 69. The shaft 70 may be rotated by means of a knob 80 detachably clutched thereto as clearly illustrated in Fig. 4. The entire mechanism thus far described with the exception of operating elements 5 and 80 may be inclosed in a box or container 81 of which the plate 32 constitutes the lid or cover.

One form of electrical connections which may be employed in connection with the apparatus, thus far described, is illustrated in Fig. 25. Each of the contact arms 21, 22 is connected to a corresponding one of the slip rings 58, the brushes of which are connected one to the battery, or other source of E. M. F., 82, and the other to the winding of a relay 83. The other side of said relay is connected through a switch, or circuit closer 85, to the other side of said battery. The armature and front contact of said relay 83 are connected in series with the primary circuit of a suitable radio transmitter 84 of which the antennæ is shown at 86. The motor 39 comprises the armature 87 and two opposing shunt field windings 88, 89. The armature 87 is connected across the battery in series with the switch 85. The contacts 53, 54, 55 are each connected to a corresponding one of the slip rings 56. The one of brushes 57 which engages the slip ring connected to the contact 55 is connected to one terminal of the armature 87 while the remaining two of said brushes 57 are each connected to one end of a corresponding one of the field windings 88, 89. The other ends of the latter are connected to the other terminal of said armature 87. The operation of the structure thus far described will be set forth hereinafter.

The bomb comprises a body portion 100 and a drag rudder 102 non-rotatably secured thereto by means of a rod or stem 101. We have discovered that by making the element 102 in the form of an inverted cone of which the altitude is small compared to the diameter of the base, said element will not only serve to retard the descent of the bomb but may be employed to deflect the latter. Thus if the element 102 which is shown in neutral position in Fig. 13 is deflected to a position as illustrated in Fig. 14 the bomb will drift to the left. In short, if the element 102 is deflected in any direction the bomb will drift in the direction in which the axis of said element moves. We provide means for selectively controlling the position of the drag element and thereby the travel of the bomb, and in order to render this system practicable we provide also means for preventing rotation of the bomb about its vertical axis, i. e., means for stabilizing the bomb in azimuth.

The stabilizing means above mentioned comprises control planes, a servo-motor for operating the same and an azimuth gyroscope for controlling the servo-motor. The control planes are shown at 103 and are each oscillatable about an axis normal to the axis of the bomb. By deflecting these planes in one direction or the other and in opposite directions to each other the bomb may be made to turn in azimuth in its descent. The planes 103 are each secured to a corresponding one of shafts 104 which extend into the bomb 100 and are rotatably mounted in journal brackets 105, 106 secured to a partition plate 107 in said bomb.

Among numerous types of suitable servo-motors we select a wind driven one-way motor for the purpose of illustration. A fan or windwheel 108 is secured to a shaft 109 rotatably mounted in bearings 110, 111 and 112 carried by the body portion 100, the said shaft being axially arranged with respect to said body portion. The shafts 109 and 104 are connected by a train of gearing including an electromagnetically controlled clutch. The gear train comprises a gear 113 secured to the shaft 109 and meshing with a gear 114 loosely mounted on a shaft 115 rotatably mounted in bearings 116, 117 carried by the body portion 100. The shaft 115 has secured thereto a gear 118 which meshes with a gear 119 secured to a shaft 121. The last mentioned shaft is rotatably mounted in bearings 106, 120 and has secured thereto a bevel gear 122 which meshes with bevel gears 123 each secured to a corresponding one of shafts 104. It will be seen that when the gear 114 is clutched to its shaft 115 and the wheel 108 is rotating, the control planes or blades 103 will be actuated to cause counter-clockwise rotation or movement of the member 100 (looking down on the latter). A spring 124 secured at one end to one of the shafts 104 and at its other end to one of the bearings 105, opposes this movement of the control plane and causes movement of the member 100 in the opposite sense when the gear 114 is free on its shaft. The following mechanism may be employed to clutch the last mentioned gear to its shaft:

A collar 125 loosely surrounds the shaft 115 below the gear 114 and is adapted to be thrown upwardly by means of an electromagnetically actuated lever 126 secured to said collar at one end and to the member 100 at its other end. The actuating electromagnet 127 is secured to the bracket 128, secured to member 100, and has its core or plunger 129 pivotally connected to an intermediate point of said lever 126. When the electromagnet 127 is energized the collar 125 is thrown upwardly to cause the gear 114 to engage a friction clutch disk 130 secured to the shaft 115, thus establishing a driving connection between said gear and shaft.

As previously stated the bomb stabilizing means comprises a gyroscope for controlling the servo-motor. The gyroscope is shown in Figs. 6 and 10 as comprisng a rotor 131, the shaft 132 of which is journaled for rotation in a ring 133 in turn supported for rotation or oscillation in a ring 134 about a horizontal axis at right angles to the shaft 132. The ring 134 is mounted on pivots 135 for rotation about a vertical axis. The upper pivot 135 is mounted on a U-shaped bracket 136 secured to the base bracket 137 in turn secured to the member 100. The lower pivot 135 (see Fig. 16) is secured to said base bracket 137. A gear 138 is rotatably mounted on the said lower pivot and has mounted thereon, but insulated therefrom, a contact segment 139 adapted to be engaged by and coöperate with a contact roller 140 secured to the ring 134. A suitable form of electrical connections is illustrated in Fig. 26 in which the contacts 139, 140 are shown connected across a battery 142 in series with the solenoid 127 and a switch 141.

In order to enhance the reliability of operation of the stabilizing apparatus we prefer to provide a follow-up connection between the control planes 103 and the gyroscope. Thus one of the shafts 104 is shown provided with a bevel gear 147, secured thereto and meshing with a bevel gear 146. The latter is secured to a shaft 144 rotatably mounted in a bearing 145, secured to member 100, and in base bracket 137 and having secured thereto a pinion 143. The last mentioned pinion meshes with the gear 138. Assuming that the bomb is descending, that the gyro rotor 131 is spinning and free to precess, that the blades 103 are free to be actuated, that the switch 141 is closed and that the parts are in the position shown in Fig. 6; the operation of the stabilizing system will be substantially as follows.

The rotor 131 will maintain its plane of rotation fixed in azimuth so that the contact 140 will be fixed in azimuth. If the bomb moves in a clockwise direction about its axis, the contact 139 will engage contact 140 to energize solenoid 127. The blades 103 will thus be thrown in such a manner as to cause counter-clockwise movement of the bomb until contacts 139, 140 disengage. When said contacts disengage the clutch 114—113 is released and the spring 124 deflects the blades 103 to cause clockwise movement of the bomb until the gyro contacts reëngage. In short, the bomb oscillates slightly about its vertical axis, or in other words, hunts slightly to each side of the plane of stabilization. Practically speaking, the plane is stabilized in azimuth as the degree of hunting may be made as small as desired. We provide means for locking the gyro and blades 103 prior to launching the bomb and means for spinning up the rotor 131. These means will be described hereinafter.

The construction of drag rudder 102 and connections between it and the body portion 100 preferred at present are illustrated in Figs. 12 to 14 and 19 to 21. Said rudder, when opened (Fig. 12) is radically different from the ordinary parachute, since it is found that such a parachute with the usual downwardly facing cup-like member will cause the bomb to veer first one way and then another like a kite without a tail, so that accurate dropping of the bomb would be impossible, especially from a moving aircraft. With a parachute or drag rudder having a dihedral angle of attack, as shown, the bomb will drop straight and maintain its perpendicular position even when dropped from a moving craft. At the same time, the speed can be reduced to the desired extent by varying the diameter of the drag rudder. The central stem or post 101 also aids in maintaining the parachute and bomb rigidly alined, thus giving a better rudder action. The stem 101 terminates in a frame 150 which clears the windwheel 108 and is riveted or otherwise secured to the body portion 100. A hollow cylindrical guard 151 surrounds said wheel 108 to protect the latter and to prevent snarling of the operating cables hereinafter described. A two-part radially slit collar 152 is secured to the stem 101 adjacent the upper end thereof, a ring 153 being clamped between the two portions of said collar 152. A plurality of ribs 154 are provided, each of said ribs being provided with a recessed extension 155 adapted to seat in a corresponding one of the slits in the collar, and to receive therethrough the ring 153. Cloth or fabric 156 secured to the under or inner side of ribs 154 completes the structure of the drag rudder proper. It will be noted that an opening 157 is provided at the center of the cloth 156 and the function of this opening will appear hereinafter.

The drag rudder 102 is normally folded as indicated in Fig. 22 and is adapted to open when the bomb is launched. In order to prevent too rapid opening of said drag rudder we provide retarding means therefor. We also utilize the opening of the drag rudder to spin the rotor 131 and to unlock the latter simultaneously with the unlocking of the blades or planes 103, to arm the bomb and to operate certain switches hereinafter referred to. One form of mechanism for accomplishing the above mentioned functions may be constructed as follows:

A drum or reel 158 is loosely mounted on the shaft 109 between bearings 111 and 112 and is adapted to have wound thereon a plurality of cables or cords 159 each connected at one end to the outer end of a corresponding one of the ribs 154. A worm gear 160, loose on the shaft 109, is connected to the drum 158 for rotation therewith by means of a flanged sleeve 161 also loosely mounted on said shaft. The worm wheel 160 meshes with a worm 162 on a shaft 163 rotatably and slidably mounted in bearings 164 on a base bracket 165 secured to the member 100. The shaft 163 enters at one end a sleeve 168 (see Fig. 10) secured to the rotor shaft 132, thereby locking the rings 133, 134 against movement. The last mentioned end of said shaft is also provided with a tongue 166 adapted to enter a notch 167 in the end of shaft 132, thus forming a driving connection between said shafts. A centrifugal governor 169 is secured to the opposite end of said shaft 163 and the weights thereof are designed to engage frictionally the interior of a drum 170 when a predetermined angular speed is attained. Notches 171 are provided in the lower flange of the drum 158, each of said notches being adapted to receive the free end of a corresponding one of the cords 159. A spiral spring 172 is secured at one end to the partition 173 and at the other end to the drum 158. The operation of this portion of our invention may be substantially as follows:

Each of the cords 159 is passed through a corresponding one of the openings 174 in member 100. The drum 158 is then turned in a clockwise direction, looking down, to place the spring 172 in tension and the inner end of each of the cords 159 is slipped into a corresponding one of notches 171. The spring 172 will then rotate the drum 158 in a counter-clockwise direction and wind the cords 159 upon the latter. Preferably the manipulation should be such that when the cords 159 are completely wound on the drum and the drag rudder 102 in the folded position, illustrated in Fig. 22, the spring 172 will be free from tension. The shaft 163 may now be moved into the position illustrated in Fig. 10 by holding the drum 158 against rotation and rotating the said shaft in the proper direction. When the bomb is launched the drag rudder 102 opens due to the wind pressure. The drum 158 is rotated in a clock-wise direction placing the spring 172 under tension, rotating worm 162 and exerting a force on the shaft 163 toward the left. The rotor 131 is thereby spun up and the governor 169 prevents the drag rudder from opening too rapidly.

The cords 159 finally completely unwind from the drum 158 and leave the latter as illustrated in Fig. 13. The spring 172 then reverses rotation of drum 158 moving the shaft 163 rapidly to the left thereby releasing the gyro for precession and leaving it in its spun up condition. It is to be borne in mind that we provide means for limiting the opening of the drag rudder as will hereinafter appear.

In order to lock the control blades in neutral position until the gyro is unlocked, mechanism such as that illustrated in Figs. 6 and 7 may be employed. One of the shafts 104 has secured thereto a disk 175 provided with a shoulder 176 adapted to be engaged by the armature 177 of an electromagnet 178. Both of the latter are secured to the base 107 and the armature has connected thereto a spring 179 connected at its other end to said base. The last described parts are so designed that the armature 177 will engage the shoulder 176 to lock the blades 103 in mid- or neutral position against the action of spring 124 until the electromagnet 178 is energized to attract its armature.

In order to energize the solenoid 178 at the proper time, i. e., when the gyro 131 is unlocked, we provide a switch 180 mounted on the base 165 and adapted to be engaged and closed by a collar 181 on the shaft 163 when the latter moves to the right to release the gyro 131. Referring to Fig. 26 it will be seen that said switch 180 is connected in series with solenoid 178 and switch 141 across the battery 142. Assuming that the switch 141 is closed, it is obvious that closure of the switch 180 will energize the solenoid to cause the release of the blades 103.

The body portion 100 of the bomb is adapted to be filled with explosive substance such as T. N. T. up to the partition 182. For firing or igniting the said charge the detonator illustrated in Figs. 6 and 17 may be employed. The partition 182 has a central tube or sleeve 183 secured thereto and extending therethrough which sleeve terminates at its top in an annular ring 184. The detonator is a unitary device adapted to be inserted into tube 183 and is designated generally at 185. The tube or body portion 186 of the latter contains the detonating charge 187 and terminates at its upper end in a cup-shaped cap 188 adapted to contain the firing mechanism. Said cap 188 carries, depending from its bottom portion, the fulminate tube 189 and contains the blocks 190, 191 and a ball 192. The blocks 190, 191 which are freely slidable in a vertical direction in the cap 188 are normally pressed apart by a spring 193 secured to one of said blocks and engaging the other. The upper block 190 carries at its central portion a firing pin 194 adapted to strike a cap 195 carried by the block 191 to cause the latter to fire through the central aperture 196 in the last mentioned block to ignite the fulminate in the tube 189. The upper face of the block 190 and the lower face of a plug 197 adapted to close the upper end of cap 188 are conically recessed and the ball 192 is placed in the recess thus formed.

A clamp 198 may be provided for clamping the detonator in position. In order to prevent premature and accidental explosion of the device the cap 188 is provided with a side opening adapted to admit a rod 199 between the pin 194 and cap 195. Obviously the inertia of one or more of members 190, 191, 192 will cause detonation of the charge when the bomb strikes its target regardless of the position in which the bomb lands, assuming, of course, that the rod 199 has been withdrawn.

A suitable form of mechanism for arming the bomb, i. e., for withdrawing the rod 199, is illustrated in Figs. 17 and 27. The outer end of said rod 199 terminates in a hook 200 adapted to receive a pin 201 carried by connecting rod 202. The other end of the latter is pivoted on a crank pin 203 carried by a gear 204. The latter is journaled for rotation in a bracket 205, secured to base 182, and meshes with a pinion 206 secured to a drum or reel 207 mounted for rotation on a bracket 208 also secured to said base 182. A cord or cable 209 is wound on said reel 207, passed upwardly through a tube 210 secured to the body portion 100 and secured to the flanged sleeve 161. When the latter is rotated by the opening of the drag rudder 102 the cord 209 will be wound thereon, thereby causing rotation of members 207 and 204 and withdrawal of the rod 199.

The withdrawal of the rod 199 by the opening of the drag rudder 102 may also be employed to operate a multi-pole switch of which the utility will appear hereinafter. Thus in Figs. 17 and 18 we have illustrated a normally open triple pole, single throw switch mounted on the base 182 and provided with a forked extension 212. The connecting rod 202 passes through said extension 212 and the latter is adapted to be engaged by the hook 200 to cause closure of the switch when the rod 199 is moved to the right on opening of the drag rudder 102.

For deflecting the drag rudder 102 to steer the bomb we employ a ring 213 which engages the upper side of said drag rudder. This ring has connected thereto at diametrically opposed points the opposite ends of a cable or cord 214. The latter is wound at least once around a drum 215 within the body portion 100 and passes through suitable openings in the latter and in a pair of opposite ribs 154. By rotating the drum 215 in one direction or the other the ring 213 will be tilted to tilt the drag rudder to the right or left as indicated in Fig. 12. As many additional steering cords and drums therefor may be employed as desirable. In the present application we illustrate one additional one 216 secured to said ring at two opposed points each 90° from the connections of cord 214 as shown in Figs. 12 and 21. The cord or cable 216 is wound around a drum 217 within the body portion 100 and passes through openings in the latter and in a pair of opposite ribs 154. The last mentioned ribs are at right angles to those through which the cable 214 passes. The top of the drag rudder may have an arrow 218 depicted thereon, said arrow being in line with the points of connection between the cable 214 and the ring 213. Referring to the direction in which the said arrow points as forward, it will be seen that by rotating the drum 215 in the proper direction the drag rudder 102 may be tilted as indicated in Fig. 14 to cause the bomb to drift to the rear. By rotating said drum 215 in the opposite direction the drag rudder will be tilted or deflected in the opposite direction to cause the bomb to drift forward. Furthermore, by rotating the drum 217 in one direction or the other, the bomb will be caused to drift to the right or left with reference to the direction in which the arrow 218 is pointing.

The length of cables 214, 216 is preferably made such that the ring 213 will stop the opening of the drag rudder 102 when the spokes 154 each make an angle of 15° with and above a horizontal plane. In order to prevent the ring 213 from slipping so far down on the drag rudder 102 as to hinder the opening of the latter, a plurality of comparatively short cords or cables 219 may connect the ring to the upper end of the stem 101.

The windwheel 108 may be employed as a source of power to rotate the drums 215, 217, suitable clutches being provided between said drums and the shaft 109. Thus the drum 215 may be secured to a shaft 220 rotatably mounted in partitions 173 and 221, said shaft having also secured thereto a worm wheel 222. The latter meshes with a worm 223 secured to a shaft 224, said shaft being journaled at one end in a bracket 225, secured to the partition 221, and at its other end in a lever 226. A friction disk 227, secured to said shaft 224 lies normally between, but out of contact with, a pair of friction disks 228, 229 secured to the windwheel shaft 108. By shifting the lever 226 to throw the disk 227 into engagement with one or the other of the disks 228, 229 the drum 215 will be rotated in one direction or the other to cause the bomb to drift forward or to the rear.

Electromagnetic means are shown for throwing the disk 227 into engagement with one or the other of its driving disks. Referring to Figs. 9 and 11 it will be seen that the lever 226 is pivoted on a bracket 230, secured to the partition 221, and is connected at its end opposite the disk 227 to the cores 231 of solenoids 232 by means of a pin and slot connection. The lever 226 is provided with a counterbalance 234 so that it will occupy a position in which the disk 227 is out of contact with disks 228, 229 when the solenoids 232 are deënergized. The solenoids 232 are secured to the partition 221 so that on energization of one or the other of these solenoids the disk 227 will engage and be driven by one of the other of disks 228, 229.

The drum 217 is provided with operating and control means in all respects similar to those for the drum 215, similar parts being designated by the same reference numerals with a prime added. The solenoids 232' for the control of drum 217, together with solenoids 232, make up a group of four solenoids. By energizing the proper one of this group the bomb may be caused to drift forward, back, to the right or to the left with respect to the direction indicated by the arrow 218 in Fig. 21. For convenience in description we have designated the one of the solenoids which causes forward drift as 232F in Fig. 26. Similarly the solenoids which cause rearward, right and left drift are designated 232B, 232'R, and 232'L in the same figure.

Limit switches or cut-outs are provided for the purpose of limiting the deflection of the drag rudder 102 to the desired position on prolonged energization of any one of the above mentioned solenoids. Referring to Figs. 6, 15 and 26 it will be seen that four limit cut-outs 241, 242, 243, 244, i. e., one for each of the four solenoids, are provided. Each of these cut-outs comprises a pair of normally engaging contact arms 245, 246 insulated from each other, except at their contact points, and insulated from the base 173 on which they are mounted. The arms 245 of the switches 241 and 242 are resilient and adapted to be disengaged from the arms 246 by predetermined movement of an arm 446. The latter is connected to a segmental gear 247 oscillatably mounted on the base or portion 173. A pinion or gear 248 is secured to the shaft 220 of the drum 215 and meshes with the segmental gear 247. Switches 243, 244 are adapted to be operated by mechanism in all respects similar to that for switches 241, 242, except that the pinion 248' thereof is connected to the shaft 221' of the drum 217. The actuating elements between the pinion 248' and switches 243, 244 which correspond to those between the pinion 248 and switches 241, 242 are designated by the same reference numerals with a prime added. The end of the arm 446 opposite the one which engages and actuates arms 245 is adapted to engage one or the other of contact segments 250, 251 insulated from each other and from the partition 173 on which they are mounted. Similar contacts 252, 253 are adapted to be engaged by one end of the arm 446'. The function of segments 250 to 253 will appear hereinafter.

A selector switch is provided for selectively controlling the solenoids 232F, 232B, 232'R and 232'L. One form of selector is illustrated in Fig. 8 and may be constructed substantially as follows. A plate 256 of insulating material is secured to the yoke 254 of an actuating solenoid 255. A plurality of contact studs 257 shown twelve in number are mounted on said plate in a position to be engaged by the switch arms 258. The latter are equiangularly spaced and connected to a twelve tooth ratchet wheel 259 rotatably mounted on said plate 256. The ratchet wheel is engaged and adapted to be actuated by a pawl 260 pivotally connected to an arm 261 in turn pivoted at 262 on said plate 256. A spring 263 may be mounted on said arm 261 in a position to engage the pawl 260 to bias the latter to ratchet-engaging position. The core 264 of the solenoid 255 is provided with a stem 265 adapted to engage and throw the arm 261 to the left to step the arms 258 one-twelfth of a revolution on energization of said solenoid. In order to return the arm 261 to the right on deënergization of said solenoid, said arm may be provided with a rod 266 adapted to be engaged by a spring arm 269 mounted on the plate 256. The arm 269 may also be employed as a circuit controller by providing coöperating front and back contact arms 268, 267. The latter are mounted on the plate 256, are insulated from each other and the arm 269, and are adapted to be alternately engaged by the latter on energization and deënergization of the solenoid 255.

Referring to Fig. 26, which illustrates one form of electrical connections for the steering control mechanism, it will be seen that the selector switch, although a twelve point switch from a mechanical standpoint, is a four position one in an electrical sense. For convenience the four successive electrical positions of the switch will be referred to as F, R, B and L. The arm 269 is connected to one side of the source 142 and the front contact 268 to the arms 258. Four different branches connect with the studs 257 as follows: Group F of said studs is connected to one side of the solenoid 232F, the other side of which is connected to the arm 245 of cut-out 241; group R is connected to one side of solenoid 232'R, the other side of which is connected to the arm 245 of the cut-out 244; group B is connected to one side of solenoid 232B, the other side of which is connected to the arm 245 of the cut-out 242; and group L is connected to one side of the solenoid 232'L of which the other side is connected to the arm 245 of cut-out 243. The arms 246 of cut-outs 241 to 244 are connected to each other and to one terminal of the switch 141. The back contact 267 is connected to each of the arms 446, 446' and the segments 250 to 253 are each connected to a corresponding one of solenoids 232F, 232B, 232'R, 232'L on the same side of the latter as that to which contacts 257 are connected. The solenoid 255 is connected at one end to the switch 141 and at the other end to the front contact 270 of the relay 272. The armature 271 of said relay is connected to the side of the battery 142 opposite the connection of the battery and switch 141. The relay 272 is connected to a radio receiver 273 of which the antennæ is designated 274 and the ground lead 275.

The operation of the steering control may be described as follows: Assume that the switches 141, 276 and 277 are closed and the arms 258, 446 and 446' in the positions shown in Fig. 26. If it is desired to cause the bomb to drift to the right a single prolonged impulse should be sent from the radio transmitter. This impulse will be received at 273 and the relay 272 will be energized to energize the solenoid 255. Energization of the latter steps the arms 258 around to engage group R of contacts 257 to close a circuit from the battery 142, through switch 141, cut-out 244, solenoid 232'R, contacts 257, contact arms 258, front contact 268, arm 269 back to battery. Energization of the solenoid 232'R causes the drag-rudder 102 to be deflected to cause the bomb to drift to the right, the deflection of said rudder being limited by engagement of arm 446' with arm 245 of the cut-out 244 which breaks the circuit of the solenoid 232'R. It should be noted that the drag rudder will remain in this deflected position until the drum 217 is rotated in the reverse direction by the shaft 109, as the pitch of the worms 222, 222' is such that drums 215, 217 cannot be rotated by the cords or cables 214, 216. The bomb will therefor continue drifting toward the right until the solenoid 255 is deënergized due to cessation of the received impulse. As soon as this happens the arm 269 leaves contact 268 and closes on back contact 267 to close the following circuit: Battery 142, switch 141, cut-out 243, solenoid 232'L, segment 252, arm 446' (which has moved onto said segment 252), contact 267, arm 269 back to battery. Energization of solenoid 232'L causes movement of the drum 217 in a direction opposite to that due to energization of the solenoid 232'R so that the drag rudder will be moved toward normal or central position. This movement continues until the arm 446' reaches the insulation between segments 252, 253 when the circuit last traced is broken. The rudder 102 is then in central position.

If it is now desired to place the arms on group L of contacts 257 a short and a long impulse should be sent. The short impulse will place the arms on group B but as the impulse does not last for a long time the energization of solenoid 232B will be very brief and although the drag rudder 102 may be deflected slightly due to movement of drum 215 it will be quickly centralized. The backward drift caused by the movement of arms 258 over group B of the contacts 257 will therefore be practically inappreciable. The long impulse, however, will place the arms 258 on group L, energizing solenoid 232'L to cause the bomb to drift to the left until the impulse ceases. On cessation of the long impulse the bomb will again centralize in a manner similar to that previously described in connection with drift to the left. It should be noted that when any one of solenoids 232F, 232B, 232'R or 232'L is energized the arm 446 or 446' moves toward the limit cut-out of that particular solenoid.

The antennæ 274, shown diagrammatically in Fig. 26, is preferably normally coiled up in a container 300 as indicated in Fig. 20. The latter is of insulating material and is shown provided with a reduced portion 301 adapted to enter the hollow upper end of the stem 101 and to be secured thereto by means of a set screw 302. The end of the antennæ on the inside of the coil is secured to a relatively small parachute 304 while the end on the outside of the coil is secured to a binding post or terminal 305 to which a properly insulated conductor 306 also connects. The latter is secured to one of the ribs 154, which are preferably of wood, by means of brackets 307 and passes downwardly as indicated in Figs. 13 and 14 into the body portion 100 through insulation 308. The end of the conductor 306 inside the body portion is electrically connected to the receiver 273. The parachute 304 is provided with a flexible stiffening ring 310 adapted to seat under a flange 309 on the container 300. The parachute has also connected thereto a cord, such as twine, 311, which is connected at its other end to the aeroplane as indicated in Fig. 22. When the bomb is launched the cord 311 becomes taut and pulls the parachute 304 from the container 300 and the antennæ will unwind. When the latter is completely unwound the cord 311 breaks and the antennæ is sustained by the parachute as indicated in Figs. 13 and 14.

The arrow 218 depicted on the upper side of the drag rudder 102 while suitable for day bombing may be invisible at night. For this reason we provide a small searchlight 312 on one side of the body portion 100, as shown in Fig. 6, to throw a slightly divergent beam as indicated in Fig. 21. The lamp 313 of said light may be connected in parallel with the solenoid 178 and in series with the switch 180 so that the light will be energized when the stabilizer system has become operative. The center line of the beam of the light will serve to indicate the position of the bomb in azimuth, as well as to indicate the location of the bomb.

The receiver, selector and batteries may be placed in the bomb as indicated in Fig. 6 and it is to be understood that the entire design is such that the bomb will drop with its vertical axis or stem 101 in a vertical line. The body portion 100 may be made in sections as indicated in Fig. 6 and any other mechanical expedients, such as hand-holes, may be adopted to render the mechanism accessible.

A suitable manner of releasably carrying a bomb or plurality of bombs on an aeroplane is illustrated in Figs. 22, 23 and 24. A pair of brackets 314, 315 are secured to the fuselage 316 on the bottom thereof. The bracket 314 is forked at its lower end to receive a pin 317 secured to the body portion 100 of the bomb. The other bracket 315 is provided at its lower end with an arc-shaped notch 318 to receive the folded drag rudder 102. The brackets 314, 315 are preferably so arranged that the center of gravity of the bomb normally lies in the same vertical plane as the center of gravity of the aeroplane. In order to hold the bomb in seated position, mechanism constructed substantially as follows may be employed.

The body portion 100 is provided with an eye 320 adapted to receive the hook-shaped end of a lever 321 pivoted on a base 322. The long arm of said lever 321 is adapted to seat against a shoulder 323 of an arm 324, also pivoted on said base 322. The upper end of said base may be connected to the fuselage 316 by means of a turnbuckle 325. By tightening said turnbuckle the bomb will be held firmly in the brackets 314, 315. The mechanism for releasing the arm 324 and consequently the bomb may assume the form clearly illustrated in Figs. 23 and 24. The arm 324 is connected by a cord or wire 330 to the arm 327 secured to a rock shaft 326. The latter is journaled at 329 on the fuselage and projects through one side of the latter. The projecting end of said shaft 326 has secured thereto a manually operable member 328 adapted to be grasped and operated by the bombing operator or observer. In order to release the bomb the handle 328 is drawn rearwardly to raise the arm 324. The hooked end of lever 322 will disengage the eye 320 and the bomb is free to drop.

Any desired bomb sight may be employed for determining the proper time at which the bomb should be released. The antennæ shown diagrammatically at 86 in Fig. 25 may be located at any suitable position on the aeroplane as may also the sender 84. The sending instrument may be located as indicated at 81 in Fig. 23 so as to be easily accessible to the observer. As many additional bombs may be carried by the aeroplane as desired. Thus we have illustrated an additional one 100' carried by the aeroplane and releasable by mechanism 328', etc., similar to that for the bomb previously described.

We wish to point out at this time that the three switches 141, 276 and 277 shown in Fig. 26 are the three switch arms of the triple pole switch 211 shown in Figs. 17 and 18.

Returning now to the operation of the sending instrument and its azimuth stabilizing mechanism it will be recalled that when the manually operable member 5 is placed over any one of the arrows shown in Fig. 3, the roller 10 will seat in one of the notches 8 and the switch 21—22 will be closed. We prefer to have the latter normally open, which may be accomplished by placing the member 5 in coincidence with any one of the indicating lines 350 each spaced about 10° in a clockwise direction from a corresponding one of the arrows referred to above. The gear 51 has secured thereto for rotation therewith a pointer 351. The latter may be secured to the shaft of said gear in such a position that it points in a direction parallel to the line connecting the center of said gear 51 and the insulation between segments 53 and 54. The indicating line 352 is so placed on the plate 32 that when the pointer 351 is placed thereon and the gyro 45 locked, the roller 55 will lie on the insulation between said segments 53, 54. An additional line 353 is provided on said plate 32 and spaced from the line 352 an angular distance in a counter-clockwise direction equal to the angular distance between any one of lines 350 and its corresponding arrow on plate 1.

The complete operation may now be summarized as follows: Assuming that the selector switch arms 258 are on group F of contacts 257, the member 5 is placed on one of lines 350 and the indicator 351 on line 353. The roller 55 will now be on contact segment 54 so that on closure of the switch 85 the motor 39 is energized to spin up the gyro rotor 45. The target may be sighted by means of the sight 331 and at the proper time the bomb 100 may be released by operating the lever 328. The drag rudder 102 then opens and the antennæ 274 unwinds. The opening of the drag rudder spins up the gyro rotor 131, closes switches 141, 276 and 277, arms the bomb, unlocks the gyro rotor 131 and simultaneously closes switch 180 to unlock the control planes 103 and energize the searchlight 313. The bomb stabilizing system now holds the bomb fixed in azimuth. The operator then moves the control element 5, together with the plate 1, until the former points in the same direction as the arrow 218 on the drag rudder or in the same direction as that indicated by the convergence of the beam of the light 313. The knob 80 is then turned which permits the arm 65 to drop away, thus breaking the driving connection between the motor 39 and rotor 45. The turning of said knob 80 also unlocks the gyro at 76—77 and permits the shaft 37 to drop causing the pinion 36 to mesh with the gear 2 and closing the clutch 40—41. The motor 39 now rotates the gears 51 and 2 in a clockwise direction until the insulation between the segments 53, 54 comes under the roller 55, i. e., through an angular distance equal to that between any one of lines 350 and a corresponding arrow. Obviously the plate 1 is rotated in the same direction and to the same extent as the gear 51 so that the arrow on said plate which is closest to the member 5 will be pointing in the same direction as the arrow 218 on the drag rudder 102. As the motor fields 88, 89 are so connected that energization of either will cause the insulation between segments 53, 54 to travel toward the roller 55, it will be clear that the sending instrument 1 will be stabilized in azimuth regardless of movement of the aeroplane on which it is mounted. Furthermore, as the bomb is stabilized in azimuth the sending instrument may be said to be fixed in azimuth with reference to the dropping bomb.

It should be borne in mind that the above described series of operations take place in a brief interval of time, i. e., before the bomb has dropped very far. The operator of the aeroplane upon which the sending instrument is mounted may circle over the target and change the path of descent of the bomb by operating the handle 5 of the sending instrument. If it is desired to cause the bomb to drift in any one of the four directions, forward, right, back or left, with respect to arrow 218, the only operation required is to rotate the handle 5 clockwise until it points in the desired direction. Thus, suppose it is desired to cause the bomb to drift to the right, the member 5 is pointed to the right with respect to the arrow 218 on the drag rudder 102. The contacts 21—22 close to energize the relay 83 to close the primary circuit of the sender 84 so that a radio impulse will be sent. This impulse will be received at 273 and the arm 258 will be moved onto group R of contacts 257 thus causing the bomb to drift to the right. The member 5 is now on one of the pointers on plate 1 and in order to break the contact between the contacts 21—22 and thereby centralize the bomb drag rudder, the said member 5 should be moved onto the next succeeding indicating line 350. Suppose further that it is now desired to cause the bomb to drift in a forward direction. The handle 5 should be moved approximately three-quarters of a turn to place it on the arrow on plate 1 which points in the same direction as the arrow 218. This results in sending two short impulses and a long one. The short impulses place the arms 258 of the selector successively on the groups B and L of the contacts 257, but as previously explained the steering apparatus practically does not respond to these short impulses. The long impulse places said arms 258 on group F of the selector contacts and the bomb will drift in a forward direction as long as said long impulse lasts. The impulse may be terminated by moving the arm 5 onto the next succeeding line 350 when the bomb drag rudder 102 will again centralize.

It should be noted that although a variety of functions are performed by the instrumentalities above described, the number of manual operations necessary to launch the bomb is surprisingly small. Thus the operator need only close switch 85, pull handle 328, point handle 5 in the same direction as the pointer 218 and operate knob 80. He may then circle or hover over the target and direct the bomb onto the latter by pointing the member 5. When the bomb strikes the target the sudden stop will actuate the firing mechanism to explode the charge.

We wish to point out that the opening 157 in the drag rudder 102 permits air to pass through the latter to aid in the release of the parachute 304 from its container. Furthermore by mounting the pivots 50 of the ring 49 of the sending-instrument-stabilizing gyro on gears 51, 52 it will be seen that said pivots will be practically fixed with relation to said ring. By virtue of this arrangement torques about the vertical axis of said gyroscope will be minimized.

If desirable a cord 500 may be passed under the drag rudder 102, when the latter is in the position indicated in Figs. 22 and 23, and secured to the aeroplane as shown. This cord together with bracket 315 will aid the spring 172 in holding the drag rudder in normally closed position. The cord 500 while strong enough to perform the above mentioned function is adapted to be broken by the weight of the bomb when the latter is released at 320. The other bomb shown may be provided with a similar cord 500'.

Our system as above described is susceptible to various modifications. For example, the spring 172 may be omitted and the momentum of the shaft 163 relied on to effect its release from the gyro 131 when the speed of the wheel 160 starts to decrease. In this case it is preferable so to design the parts that there is considerable friction between drum 158 and hub 111.

In setting the drum 158, as previously described, care should be taken to disengage the rods 199 and 202 of the arming device before said setting is accomplished and to rewind the reel 207 and reëngage said rods when the setting has been accomplished.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:—

1. In combination, a gravity bomb, means carried by said bomb for controlling the descent thereof and controllable means remote from said bomb for controlling the first mentioned means.

2. In combination, a gravity bomb, means carried by said bomb for deflecting the latter from its normal path of descent and controllable means remote from said bomb for controlling the first mentioned means.

3. In combination, a gravity bomb, means carried by said bomb for deflecting the latter from its normal path of descent in any one of a plurality of directions and controllable means remote from said bomb for controlling the first mentioned means.

4. In combination, a gravity bomb, means carried by said bomb for stabilizing it in azimuth and remotely controlled means carried by said bomb for controlling the descent thereof.

5. In combination, a gravity bomb, means carried by said bomb for stabilizing it in azimuth and remotely controlled means carried by said bomb for causing the latter to alter its path of descent.

6. In combination, a gravity bomb, a manually operable control element and means for causing said bomb to travel in any one of a plurality of directions after it has been launched by pointing said element in the desired direction.

7. In combination, a bomb, a sending instrument for controlling the descent of said bomb, means for stabilizing said instrument in azimuth and means for stabilizing said bomb in azimuth while said bomb is dropping.

8. In combination, a gravity bomb and means responsive to rotation of said bomb about its vertical axis for causing rotation thereof in an opposite direction.

9. In combination, a gravity bomb, a drag rudder connected to said bomb and means for deflecting said drag rudder to steer said bomb.

10. In combination, a bomb, means comprising a gyroscope for stabilizing said bomb, a drag rudder connected to said bomb and means actuated by said drag rudder, on assumption of operative position by the latter, for rendering said gyroscope operative.

11. In combination, a bomb, means comprising a gyroscope for stabilizing said bomb, a normally inoperative drag rudder connected to said bomb and means for spinning up said gyroscope by the movement of said drag rudder to operative position.

12. In combination, a bomb, a drag rudder connected to said bomb, means controlled by said drag rudder for arming said bomb, and means for deflecting said drag rudder to steer said bomb.

13. In combination, a bomb, a drag rudder connected to said bomb, means actuated by said drag rudder for arming said bomb, and means for deflecting said drag rudder to steer said bomb.

14. In combination, a bomb casing, a drag rudder connected thereto in a normally folded position, a gyroscope mounted in said casing and means actuated by the opening of said drag rudder for spinning up said gyroscope.

15. In combination, a gyro rotor and means comprising a slidable worm shaft for spinning up said rotor.

16. In combination, a gyro rotor, a shaft movable longitudinally into and out of engagement with the shaft of said rotor, a worm on said movable shaft and means including a wormwheel for actuating said worm.

17. In combination, a bomb having a normally closed drag rudder connected thereto and means for preventing said drag rudder from opening at a speed greater than a predetermined amount.

18. A stabilized bomb comprising a gyroscope, control planes governed by said gyroscope, means for locking said gyroscope and planes against movement and means for simultaneously releasing said gyroscope and planes.

19. In combination, a bomb, a normally coiled antennæ secured to said bomb and means for unwinding said antennæ on launching of said bomb.

20. In combination, a bomb, a drag rudder connected thereto and means comprising a ring for limiting the opening of said drag rudder.

21. In combination, a bomb, a drag rudder connected thereto, means comprising a ring for limiting the opening of said drag rudder and means for tilting said drag rudder by actuating said ring.

22. In combination, a gravity bomb, means carried by said bomb for steering said bomb in any one of a plurality of directions, and selective means controllable at the will of a distant operator and carried by said bomb for controlling said first named means.

23. In combination, a dirigible device, means for steering said device, a plurality of translating devices for controlling said steering means, means responsive to an impulse of radiant energy for rendering one of said translating devices operative and means for rendering another of said translating devices operative on cessation of said impulse.

24. In combination, a dirigible device, a plurality of translating devices carried by said device for controlling the steering thereof, an electromagnetically actuated selector switch, means for rendering one of said translating devices operative when the electromagnet of said switch is ener ed and means for rendering another of id translating devices operative when said electromagnet is deënergized.

25. In combination, a dirigible device, a plurality of translating devices carried by said device for controlling the steering thereof, an electromagnetically actuated selector switch, means for rendering one of said translating devices operative when the electromagnet of said switch is energized, means for rendering another of said translating devices operative when said electromagnet is deënergized and means called into action on operation of any one of said translating devices for rendering the operative translating device inoperative.

26. In combination, a gravity bomb having a steering rudder, power means for actuating said rudder in opposite directions, means responsive to an impulse of radiant energy for causing said power means to actuate said rudder in one direction and means controlled by said second named means for centralizing said rudder on cessation of said impulse.

27. In combination, a bomb having a steering rudder, power means for actuating said rudder in opposite directions, means responsive to an impulse of radiant energy for causing said power means to actuate said rudder in one direction, means controlled by said second named means for centralizing said rudder on cessation of said impulse and means for limiting the throw of said rudder.

28. In combination, an aeroplane, a control element mounted on said aeroplane, a bomb adapted to be launched from said aeroplane and means for steering said bomb in any one of a plurality of directions after it has been launched by pointing said element in the desired direction.

29. A system for controlling an element comprising a gyroscope, a motor controlled by said gyroscope, means for connecting said motor to said element for actuating the latter and means for connecting said motor to the rotor of said gyroscope for spinning the rotor up.

30. Means for controlling an element comprising a gyroscope, a motor controlled by said gyroscope, means for connecting said motor to the rotor of said gyroscope for actuating the latter, a release device and means for breaking the connection between said motor and rotor and for connecting said motor to said element on actuation of said release device.

31. In combination, a movable support, a sending instrument movably mounted on said support, means for stabilizing said instrument in azimuth and means for disconnecting said instrument from said means whereby the position of said instrument may be adjusted with respect to said support.

32. In combination, a support, a gyroscope movably mounted on said support, means for locking said gyro against all movement, with respect to said support, except rotation about the spinning axis, a motor for spinning the rotor of said gyro, a sending instrument on said support, a release device and means operative on actuation of said release device for releasing said locking means and for connecting said motor to said instrument.

33. The combination with a gyroscope, of means associated therewith for controlling the steering of an object, a motor, releasable connections between said motor and gyroscope for spinning up the same and between said motor and said other means, means for automatically breaking said first named connection, and for making the last named connection and means on the gyroscope for controlling the motor.

34. In combination, a gravity bomb, a gyroscope mounted thereon, spinning up means therefor, and means controlled by said gyroscope for stabilizing the bomb in azimuth.

35. The combination with an aeroplane and a gravity bomb, of a sending instrument carried by the aeroplane, a receiver on the bomb, and means brought into action thereby for deflecting the bomb from its normal path of descent.

36. The combination with an aeroplane and a gravity bomb, of a sending instrument carried by the aeroplane, means for maintaining the azimuth position of said instrument, means for stabilizing the bomb in azimuth, a receiver on the bomb, and means brought into action thereby for deflecting the bomb from its normal path of descent.

37. The combination with a gravity bomb, of a servo-motor thereon for governing the descent thereof, and a wind motor on the bomb for driving said servo-motor.

38. The combination with a gravity bomb, of a plurality of rudders thereon, mounted to turn about axes perpendicular to the axis of the bomb, and means for turning said rudders in opposite directions to turn the bomb about its said axis.

39. The combination with an aeroplane and a gravity bomb, of a sending instrument carried by said aeroplane, means for maintaining the relation in azimuth between said instrument and bomb fixed regardless of the movements of said aeroplane, a receiver on said bomb and means brought into action thereby for deflecting the bomb from its normal path of descent.

40. In combination a gyroscope, power means for driving the rotor of said gyroscope, means for locking said gyroscope against oscillation and means responsive to a decrease in speed of said power means for releasing said gyroscope.

41. In combination, a gyroscope, a shaft, means for connecting said shaft to the shaft of the rotor of said gyroscope to drive the latter and to lock said gyroscope against oscillation, power means for driving said first mentioned shaft and means for breaking the connection between said shafts when the speed of said power means decreases.

42. In combination, a gyroscope, a shaft, means for connecting said shaft to the shaft of the rotor of said gyroscope to drive the latter and to lock said gyroscope against oscillation, a worm mounted on said first mentioned shaft, a worm wheel coupled thereto, power means for turning said worm a predetermined amount, a slidable mounting for said worm shaft whereby said shafts are held in contact so long as said means is operative, but are disengaged on decrease in speed of said power means.

43. In combination, an aeroplane, a control element mounted on said aeroplane, stabilizing means for establishing a base line for said control element, a bomb adapted to be launched from said aeroplane and means for steering said bomb in any one of a plurality of directions after it has been launched by pointing said element in the desired direction.

44. In combination with a gravity bomb, means controllable at the will of a distant operator and carried by said bomb for controlling the descent thereof.

45. In combination with a gravity bomb, remotely controlled means responsive to radiant energy and carried by said bomb for deflecting the latter from the normal path of descent.

46. In combination, a gravity bomb, and means controllable at the will of a distant operator and carried by said bomb for deflecting the latter from the normal path of descent in any one of a plurality of directions.

47. In combination, a gravity bomb, a gyroscope mounted thereon, and means controlled by said gyroscope for stabilizing the bomb in azimuth.

48. In combination, an element propelled solely by the action of gravity, and means carried by said element for stabilizing the same in azimuth.

49. In combination, a gravity bomb, and means responsive to displacement of said bomb about its vertical axis for resetting the same.

In testimony whereof we have affixed our respective signatures.

ELMER A. SPERRY.
THOMAS H. PHILLIPS, Jr.